United States Patent
Ordonez et al.

(10) Patent No.: US 11,392,348 B2
(45) Date of Patent: Jul. 19, 2022

(54) ORDERING RECORDS FOR TIMED META-DATA GENERATION IN A BLOCKED RECORD ENVIRONMENT

(71) Applicant: INTERNATIONAL BUSINESS MACHINES CORPORATION, Armonk, NY (US)

(72) Inventors: Bonnie Michele Ordonez, Poughkeepsie, NY (US); Scott Ballentine, Poughkeepsie, NY (US); Anthony Thomas Sofia, Hopewell-Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 248 days.

(21) Appl. No.: 16/789,469

(22) Filed: Feb. 13, 2020

(65) Prior Publication Data

US 2021/0255829 A1    Aug. 19, 2021

(51) Int. Cl.
*G06F 7/08*     (2006.01)
*G06F 7/24*     (2006.01)
*G06F 16/23*    (2019.01)

(52) U.S. Cl.
CPC ............ *G06F 7/08* (2013.01); *G06F 16/2379* (2019.01)

(58) Field of Classification Search
CPC .......... G06F 7/08; G06F 16/2379; G06F 7/24; G06F 16/2365
See application file for complete search history.

(56) References Cited

U.S. PATENT DOCUMENTS

| | | |
|---|---|---|
| 6,532,121 B1 | 3/2003 | Rust et al. |
| 6,816,957 B1 | 11/2004 | Halladay et al. |
| 8,879,728 B2 | 11/2014 | Macmillan et al. |
| 8,943,332 B2 | 1/2015 | Horne et al. |
| 9,471,119 B2 | 10/2016 | Dayka et al. |

(Continued)

FOREIGN PATENT DOCUMENTS

| | | |
|---|---|---|
| CN | 101692239 B | 10/2012 |
| CN | 103795811 B | 5/2015 |

(Continued)

OTHER PUBLICATIONS

IBM "List of IBM Patents or Patent Applictions Treated as Related"; (Appendix P), Date filed Feb. 13, 2020; 2 pages.

(Continued)

*Primary Examiner* — Robert W Beausoliel, Jr.
*Assistant Examiner* — Mohammad S Bhuyan
(74) *Attorney, Agent, or Firm* — Cantor Colburn LLP; Teddi Maranzano

(57) ABSTRACT

Embodiments are described for ordering records. Aspects include blocking one or more records and storing the one or more blocked records as a set of records. Aspects also include reserving space for a metadata record for each of the one or more blocked records that meet one or more selection criteria and generating the metadata record for each of the one or more blocked records that meet the one or more selection criteria. Aspects further include adding the metadata records to the set of blocked records and storing the set of records including the metadata records.

17 Claims, 3 Drawing Sheets

(56) References Cited

U.S. PATENT DOCUMENTS

| | | | |
|---|---|---|---|
| 2005/0071436 A1* | 3/2005 | Hsu | ................... G06F 11/1096 |
| | | | 709/212 |
| 2005/0232421 A1 | 10/2005 | Simons et al. | |
| 2009/0327732 A1 | 12/2009 | Buhler et al. | |
| 2011/0145593 A1 | 6/2011 | Auradkar et al. | |
| 2015/0121081 A1 | 4/2015 | Dayka et al. | |
| 2016/0171205 A1 | 6/2016 | Bauer et al. | |
| 2016/0210450 A1 | 7/2016 | Su | |
| 2016/0301704 A1 | 10/2016 | Hassanzadeh et al. | |
| 2016/0364463 A1* | 12/2016 | Chen | ....................... G06F 16/22 |
| 2017/0032148 A1 | 2/2017 | Sofia et al. | |
| 2017/0041296 A1 | 2/2017 | Ford et al. | |
| 2017/0103167 A1 | 4/2017 | Shah | |
| 2017/0344474 A1* | 11/2017 | Zhou | ................... G06F 12/0646 |
| 2018/0075257 A1 | 3/2018 | Sofia et al. | |
| 2018/0077184 A1 | 3/2018 | Thom et al. | |
| 2019/0207759 A1 | 7/2019 | Chan et al. | |
| 2019/0207767 A1 | 7/2019 | Ahn | |
| 2019/0236302 A1 | 8/2019 | Czerkowicz et al. | |
| 2019/0236316 A1 | 8/2019 | Watkins et al. | |
| 2019/0245682 A1 | 8/2019 | Alwen | |
| 2019/0289019 A1 | 9/2019 | Thekadath et al. | |
| 2020/0004577 A1* | 1/2020 | Parkinson | ................. G06F 9/48 |
| 2020/0349121 A1* | 11/2020 | Lee | ....................... G06F 3/0661 |
| 2021/0132829 A1* | 5/2021 | Zhao | ..................... G06F 3/0614 |

FOREIGN PATENT DOCUMENTS

| | | |
|---|---|---|
| CN | 102821138 B | 6/2015 |
| CN | 106682530 A | 5/2017 |
| CN | 104331478 B | 9/2017 |

OTHER PUBLICATIONS

IBM, "z/Architecture Principles of Operation," IBM® Publication No. SA22-7832-10, Eleventh Edition, Mar. 2015, pp. 1-1732. Due to Size Constraints this document is uploaded in 5 parts.

Kuan, Michael et al., Pending U.S. Non-Provisional Application Entitled: "Event Log Tamper Resistance"; U.S. Appl. No. 16/595,563, filed Oct. 8, 2019.

International Search Report and Written Opinion for International Application No. PCT/IB2020/058764; dated Jan. 15, 2021; 9 pgs.

Transmittal Form PTO/SB/21, filed Mar. 16, 2020.

* cited by examiner

ORDERING RECORDS FOR TIMED META-DATA GENERATION IN A BLOCKED RECORD ENVIRONMENT

BACKGROUND

The present invention relates generally to the field of record management, and more particularly to ordering generated metadata with blocked records so as to be re-associated at a later time.

In a recording record system, for example, a logging system for events occurring within an operating system, individual records are commonly provided to a component for management. This component, or record management facility, is responsible for accumulating records from different system components, storing the accumulated records to some media, and retrieving the stored records at some later time based on one or more selection criteria.

SUMMARY

An aspect includes a computer-implemented method for ordering records. The method includes blocking one or more records and storing the one or more blocked records as a set of records. The method also includes reserving space for a metadata record only for each of the one or more blocked records that meet one or more selection criteria and generating the metadata record for each of the one or more blocked records that meet the one or more selection criteria. The method further includes adding the metadata records to the set of blocked records and storing the set of records including the metadata records.

Another aspect includes a system including a memory and a processor. The processor is operable to block one or more records and store the one or more blocked records as a set of records. The processor is also operable to reserve space for a metadata record only for each of the one or more blocked records that meet one or more selection criteria and generate the metadata record for each of the one or more blocked records that meet the one or more selection criteria. The processor is further operable to add the metadata records to the set of blocked records and store the set of records including the metadata records.

Another aspect includes a computer program product including a non-transitory computer readable storage medium having program instructions embodied therewith, the program instructions being executable by a processor to cause the processor to perform a method. The method includes blocking one or more records and storing the one or more blocked records as a set of records. The method also includes reserving space for a metadata record only for each of the one or more blocked records that meet one or more selection criteria and generating the metadata record for each of the one or more blocked records that meet the one or more selection criteria. The method further includes adding the metadata records to the set of blocked records and storing the set of records including the metadata records.

BRIEF DESCRIPTION OF THE DRAWINGS

The examples may be better understood with reference to the following figures and description. The components in the figures are not necessarily to scale. Moreover, in the figures, like-referenced numerals designate corresponding parts throughout the different views.

Additional features and advantages are realized through the techniques of the technical solutions, examples, and aspects of which, are described in detail herein.

DETAILED DESCRIPTION

Metadata can be defined as some auxiliary information that is able to be generated automatically from source data. Metadata can be generated for records at a given time interval (i.e., timer driven) or as the result of some generating event that occurs past the time interval (i.e., driven by an input record). An example of metadata generation driven by an input record is scoring, which occurs when an user gathers records immediately thereby causing metadata to be generated. However, because the generating event occurs past the time interval, the record may have already been blocked for output and thus cannot trigger metadata generation.

Embodiments of the present invention provide systems and methods for generating metadata for records that are already ordered and then handle the post-process merging of this metadata back into order at a later time. Embodiments of the present invention provide efficient systems and methods for generating metadata for blocked records and merging the metadata into ordered records during the de-blocking process. This transformation is non-destructive (i.e., the original date is not modified) but additional metadata is added.

Figure 1:
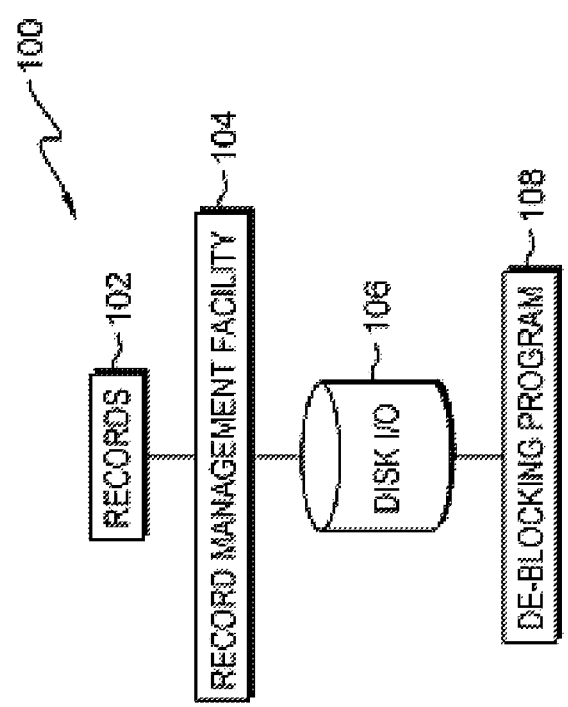
FIG. 1 is a functional block diagram illustrating a record ordering system environment, in accordance with an embodiment of the present invention.

The present invention will now be described in detail with reference to the figures. FIG. 1 is a functional block diagram illustrating a record ordering system environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. In an exemplary embodiment, environment 100 includes records 102, record management facility 104, disk input/output (I/O) 106, and de-blocking program 108.

Records 102 represents one or more records, with each record representing a collection of attributes that describe a real-world entity. A record consists of fields, with each field describing an attribute (a characteristic or quality) of the entity (object, person, place, or event).

Record management facility 104 consolidates records previously stored as separate records into a common pool of data that provides data for many applications. Record management facility 104 performs a preprocessing step called blocking, which relies on fixed-sized blocks of memory to prepare records 102 before committing them to attached storage via I/O disk 106. Blocking comprises writing several records as a contiguous block. Blocking increases the amount of data that may be stored because there are fewer inter-block gaps. De-blocking comprises returning blocked records back to the original state of storage.

Disk I/O 106 is any operation, program, or device that transfers data to or from a computer. Disk I/O 106 is capable of writing records to an attached storage, and reading records stored in the attached storage. In this exemplary embodiment, disk I/O 106 blocks records 102 and writes the blocked records 102 to an attached storage.

De-blocking program 108 handles generating metadata for records 102 that are already blocked and after de-blocking, merges this metadata into logical order with corresponding records 102. In general, de-blocking puts the records back into the original form. In this exemplary embodiment, de-blocking program 108 provides a method of ordering records 102, such that metadata that is generated for blocked records 102 can be merged with its corresponding records 102 after de-blocking. De-blocking program 108 can generally include any software capable of generating metadata for blocked records 102, de-blocking records 102, and re-ordering records 102 such that generated metadata is merged with its corresponding records 102.

Figure 2:
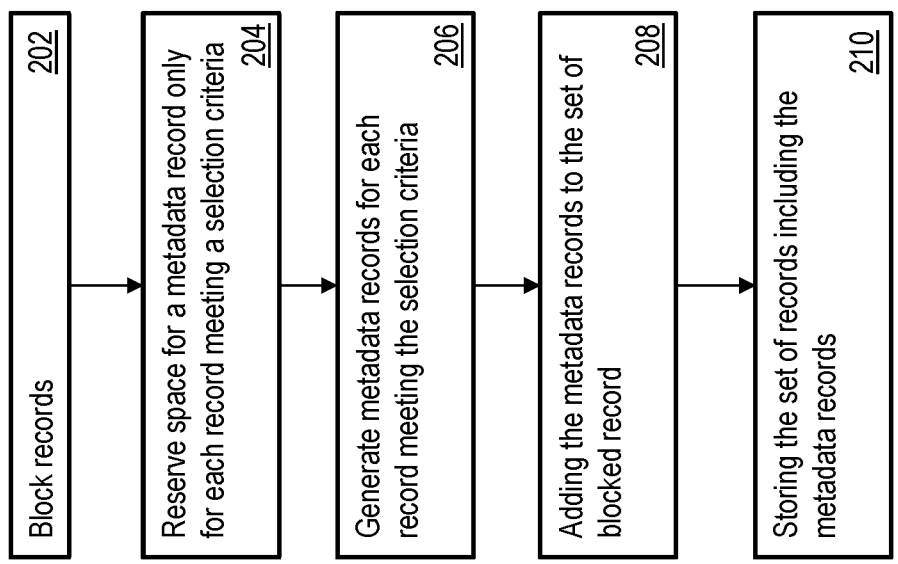
FIG. 2 is a flowchart depicting operational steps for a record ordering system, in accordance with an embodiment of the present invention.

FIG. 2 is a flowchart depicting a method of ordering records in accordance with an embodiment of the present invention. As shown at block 202, the method includes blocking records via record management facility. In exemplary embodiments, records are blocked to optimize available storage. Blocked records are written to attached storage via disk I/O. For example, records 1, 2, and 3 are rarely used and haven't been accessed in a period of time. Record management facility blocks records 1, 2, and 3 and writes them to attached storage via disk I/O to free up available storage. Blocked records 1, 2, and 3 are written to attached storage in fixed size blocks, or record blocks (explained in greater detail with respect to FIGS. 3A and 3B).

Next, as shown at block 204, the method includes reserving space for a metadata record only for each record block that meets one or more selection criteria. In exemplary embodiments, metadata records are not generated for each record block. Rather, metadata records are only generated for record blocks that meet the one or more selection criteria. Accordingly, by only reserving space for metadata records for record blocks that meet the one or more selection criteria, storage space can be saved by not reserving space for metadata records that will not be generated. As shown at block 206, the method includes generating metadata records for blocked records that meet the one or more selection criteria. The method also includes adding the metadata records to the set of blocked records, as shown at block 208. The method further includes storing the set of records including the metadata records, as shown at block 210.

In exemplary embodiments, a metadata record is only reserved and generated for at most one blocked record written each minute. Accordingly, in these embodiments, each of the blocked records includes a timestamp that indicates when the blocked record was written, and the one or more selection criteria includes determining that space has not been previously reserved for a metadata record that has a timestamp that has a same minute value as the blocked record. For example, when processing a blocked record with a timestamp in the format of DD:HH:MM:SS, the timestamp is compared to the timestamp of the last blocked record that has a reserved metadata block. If the timestamp of the last blocked record that has a reserved metadata block has a different MM value than the current blocked record, a metadata block is reserved for the current blocked record. Otherwise, if the timestamp of the last blocked record that has a reserved metadata block has the MM value than the current blocked record, a metadata block is not reserved.

In exemplary embodiments, a metadata record is only reserved and generated for blocked records when a time period between when the last blocked record having reserved metadata was written the time that the current blocked record was written exceeds a threshold value. Accordingly, in these embodiments, each of the blocked records includes a timestamp that indicates when the blocked record was written, and the one or more selection criteria include determining that space has not been reserved for the metadata record for one of the one or more blocked records during a threshold period of time from the timestamp of the blocked record. For example, when processing a blocked record with a timestamp in the format of DD:HH:MM:SS, the timestamp is compared to the timestamp of the last blocked record that has a reserved metadata block. If the difference between the timestamp of the last blocked record that has a reserved metadata block and the timestamp of the current blocked record exceeds a threshold value, a metadata block is reserved for the current blocked record. Otherwise, if the difference between the timestamp of the last blocked record that has a reserved metadata block and the timestamp of the current blocked is less than the threshold value, a metadata block is not reserved.

In exemplary embodiments, a metadata record is only reserved and generated for at most one blocked record out of a threshold number of blocked records. Accordingly, in these embodiments, a counter is maintained that is used to count a number of blocked records that are processed and the counter is reset to zero every time a metadata record is reserved and the one or more selection criteria include determining that space has not been reserved for the metadata record for a maximum consecutive number of the one or more blocked records, i.e., that the counter exceeds the threshold number. If the counter exceeds the threshold number, a metadata block is reserved for the current blocked record. Otherwise, if the counter does not exceed the threshold number, a metadata block is not reserved and the counter is incremented.

In exemplary embodiments, the one or more selection criteria include a combination of the one or more selection criteria discussed above. For example, in one embodiment, a metadata record is only reserved and generated when a metadata record has not been reserved for the last ten blocked records or if a metadata record has not been reserved for a blocked record that was written more than a minute prior to the current blocked record. It will be appreciated by those of ordinary skill in the art that the number of blocked records, ten, and the time period, one minute, are used solely for exemplary purposes and that various values could be used based on the desired implementation.

In one embodiment, the determination of whether the one or more selection criteria is met is performed twice, once to determine whether to reserve space for the metadata record and again to determine if the metadata record should be generated. In other embodiments, the determination of whether the one or more selection criteria is met is only performed once to determine whether to reserve space for the metadata record. If the one or more selection criteria is met a flag is set and that flag is referred to determine if the metadata record should be generated.

Figure 3:
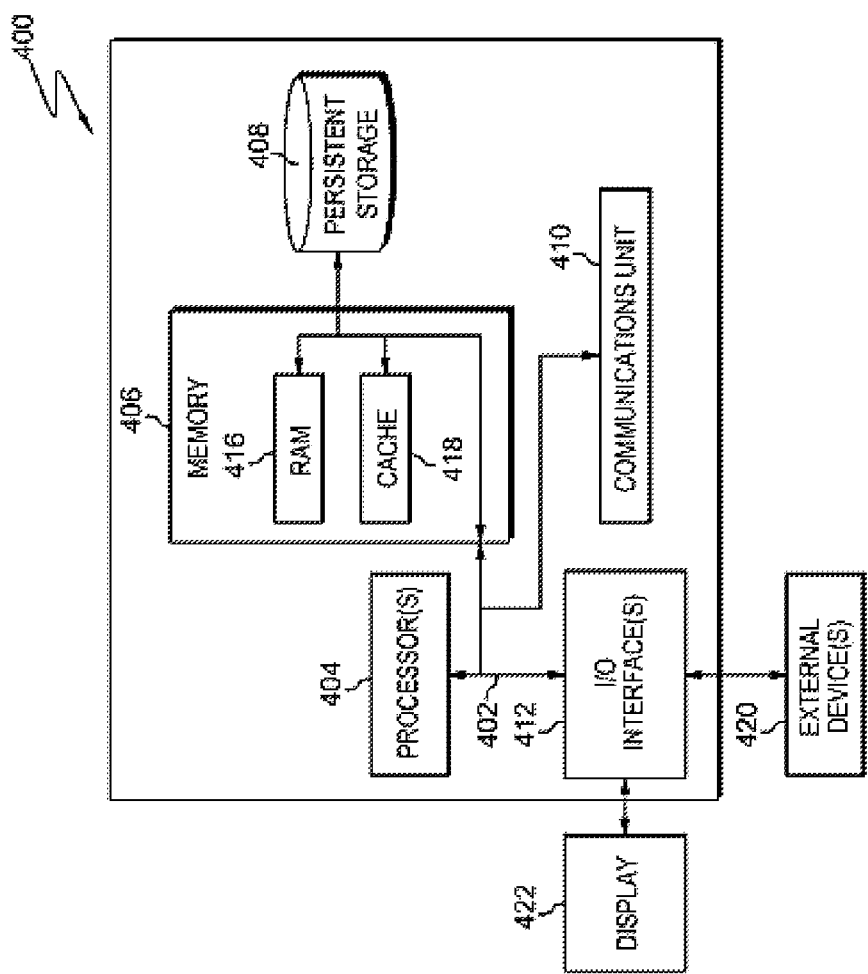
FIG. 3 is a block diagram of internal and external components of a computer system, in accordance with an embodiment of the present invention.

Referring now to FIG. 3, a computing device 400 for practicing the teachings herein is shown. The computing device 400 includes communications fabric 402, which provides for communications between one or more processing units 404, memory 406, persistent storage 408, communications unit 410, and one or more input/output (I/O)

interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touchpad, pointing device, or other human interface devices. External devices 420 can also include portable computer readable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The examples in the present document have been presented for purposes of illustration and description, and not intended to be exhaustive or limited to those in the form disclosed. Many modifications and variations will be apparent to those of ordinary skill in the art without departing from the scope and spirit of the present document. The examples were chosen and described in order to best explain the principles of the technical solutions and the practical application, and to enable others of ordinary skill in the art to understand the various examples with various modifications as are suited to the particular use contemplated.

The technical solutions may be implemented as a system, a method, and/or a computer program product. The computer program product may include a computer readable storage medium (or media) having computer readable program instructions thereon for causing a processor to carry out aspects of the technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the technical solutions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described throughout the present application.

Aspects of the present application are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples described throughout the present document. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples in the present document have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A computer-implemented method for ordering records, the method comprising:
blocking, by one or more computer processors, one or more records;
storing, by one or more computer processors, the one or more blocked records as a set of records;
reserving, by one or more computer processors, space for a metadata record for each of the one or more blocked records that meet one or more selection criteria, wherein determining that a blocked record meets the one or more selection criteria comprises determining that space has not been reserved for the metadata record for one of the one or more blocked records that has a timestamp that has a same minute value as the blocked record;
generating, by one or more computer processors, the metadata record for each of the one or more blocked records that meet the one or more selection criteria;
adding, by one or more computer processors, the metadata records to the set of blocked records; and
storing, by one or more computer processors, the set of records including the metadata records.

2. The computer-implemented method of claim 1, further comprising responsive to receiving an indication to de-block the set of records and the metadata records, de-blocking, by one or more computer processors, the set of records and the metadata records.

3. The computer-implemented method of claim 2, wherein de-blocking the set of records and metadata records comprises:
matching, by one or more computer processors, the metadata records with a corresponding record from the set of records; and
generating, by one or more computer processors, a storage layout such that the metadata records are grouped with an associated record of the set of records.

4. The computer-implemented method of claim 1, wherein determining that a blocked record meets the one or more selection criteria further comprises:
  determining that space has not been reserved for the metadata record for one of the one or more blocked records during a threshold period of time from the timestamp of the blocked record.

5. The computer-implemented method of claim 1, wherein determining that a blocked record meets the one or more selection criteria further comprises:
  determining that space has not been reserved for the metadata record for a maximum consecutive number of the one or more blocked records.

6. The computer-implemented method of claim 1, wherein determining that a blocked record meets the one or more selection criteria further comprises at least one of:
  determining that space has not been reserved for the metadata record for one of the one or more blocked records during a threshold period of time from the timestamp of the blocked record; and
  determining that space has not been reserved for the metadata record for a maximum consecutive number of the one or more blocked records.

7. A system, comprising:
  a memory; and
  a processor; wherein the processor is configured to:
    block one or more records;
    storing the one or more blocked records as a set of records;
    reserve space for a metadata record for each of the one or more blocked records that meet one or more selection criteria, wherein determining that a blocked record meets the one or more selection criteria comprises determining that space has not been reserved for the metadata record for one of the one or more blocked records that has a timestamp that has a same minute value as the blocked record;
    generate the metadata record for each of the one or more blocked records that meet the one or more selection criteria;
    add the metadata records to the set of blocked records; and
    store the set of records including the metadata records.

8. The system of claim 7, wherein the processor is further configured to receive an indication to de-block the set of records and the metadata records and responsively de-block the set of records and the metadata records.

9. The system of claim 7, wherein determining that a blocked record meets the one or more selection criteria further comprises:
  determining that space has not been reserved for the metadata record for one of the one or more blocked records that has a timestamp that has a same minute value as the blocked record.

10. The system of claim 7, wherein determining that a blocked record meets the one or more selection criteria further comprises:
  determining that space has not been reserved for the metadata record for one of the one or more blocked records during a threshold period of time from the timestamp of the blocked record.

11. The system of claim 7, wherein determining that a blocked record meets the one or more selection criteria further comprises:
  determining that space has not been reserved for the metadata record for a maximum consecutive number of the one or more blocked records.

12. The system of claim 7, wherein determining that a blocked record meets the one or more selection criteria further comprises at least one of:
  determining that space has not been reserved for the metadata record for one of the one or more blocked records during a threshold period of time from the timestamp of the blocked record; and
  determining that space has not been reserved for the metadata record for a maximum consecutive number of the one or more blocked records.

13. A computer program product comprising a non-transitory computer readable storage medium having program instructions embodied therewith, the program instructions being executable by a processor to cause the processor to perform a method comprising:
  blocking, by one or more computer processors, one or more records;
  storing, by one or more computer processors, the one or more blocked records as a set of records;
  reserving, by one or more computer processors, space for a metadata record for each of the one or more blocked records that meet one or more selection criteria, wherein determining that a blocked record meets the one or more selection criteria comprises determining that space has not been reserved for the metadata record for one of the one or more blocked records that has a timestamp that has a same minute value as the blocked record;
  generating, by one or more computer processors, the metadata record for each of the one or more blocked records that meet the one or more selection criteria;
  adding, by one or more computer processors, the metadata records to the set of blocked records; and
  storing, by one or more computer processors, the set of records including the metadata records.

14. The computer program product of claim 13, wherein the method further comprises responsive to receiving an indication to de-block the set of records and the metadata records, de-blocking, by one or more computer processors, the set of records and the metadata records.

15. The computer program product of claim 13, wherein determining that a blocked record meets the one or more selection criteria further comprises:
  determining that space has not been reserved for the metadata record for one of the one or more blocked records during a threshold period of time from the timestamp of the blocked record.

16. The computer program product of claim 13, wherein determining that a blocked record meets the one or more selection criteria further comprises:
  determining that space has not been reserved for the metadata record for a maximum consecutive number of the one or more blocked records.

17. The computer program product of claim 13, wherein determining that a blocked record meets the one or more selection criteria further comprises at least one of:
  determining that space has not been reserved for the metadata record for one of the one or more blocked records during a threshold period of time from the timestamp of the blocked record; and
  determining that space has not been reserved for the metadata record for a maximum consecutive number of the one or more blocked records.

* * * * *